Sept. 9, 1969 G. E. KEEFE ET AL 3,466,640

MAGNETIC FILM MEMORIES

Filed Jan. 7, 1964 2 Sheets-Sheet 1

INVENTORS
GEORGE E. KEEFE
SIMON MIDDELHOEK
BY Stephen J. Limanek
ATTORNEY

Sept. 9, 1969 G. E. KEEFE ET AL 3,466,640

MAGNETIC FILM MEMORIES

Filed Jan. 7, 1964 2 Sheets-Sheet 2

United States Patent Office 3,466,640

Patented Sept. 9, 1969

3,466,640

MAGNETIC FILM MEMORIES

George E. Keefe, Montrose, N.Y., and Simon Middelhoek, Kilchberg, Zurich, Switzerland, assignors to International Business Machines Corporation, New York, N.Y., a corporation of New York Filed Jan. 7, 1964, Ser. No. 336,166
Int. Cl. G11b *5/78*
U.S. Cl. 340—174 3 Claims

ABSTRACT OF THE DISCLOSURE

A nondestructive-readout memory device with little or no disturb sensitivity utilizes a magnetic film in which either a "1" or "0" can be stored while the film is in a demagnetized state. The film has a plurality of adjoining domains each extending lengthwise of the easy axis. During the write operation the magnetization vectors of all the domains are rotated into the hard direction. The magnetization of a selected domain or domains is then allowed to rotate back into a desired easy direction depending upon whether a "1" or "0" is to be written. The magnetization of the remaining domain or domains will assume the opposite direction at the end of the write operation. The reading operation involves rotating the magnetization of only a selected one or ones of the domains without disturbing the magnetic orientation of the other domain or domains.

Figure 1:
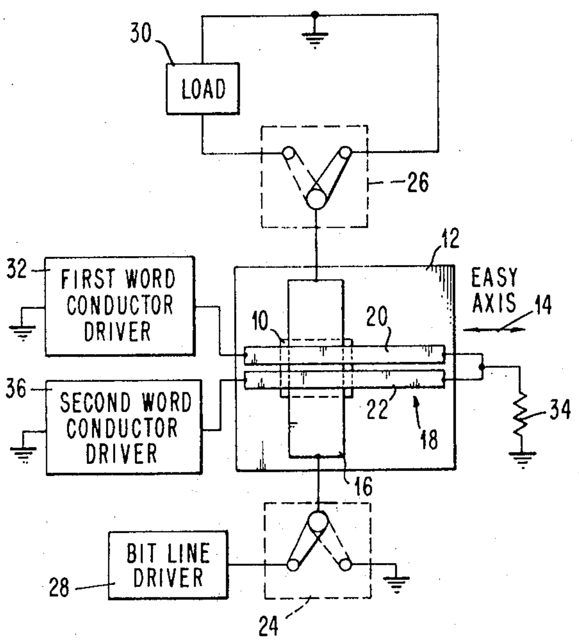

This invention relates to magnetic film storage systems and more particularly to improved magnetic systems employing magnetostatically coupled films.

At toroidal magnetic core having a square hysteresis loop can be switched by applying simultaneously thereto two magnetic field pulses, while the application of either of the pulses alone any number of times does not affect the magnetic state of the core. It is known that the simultaneous application of two magnetic field pulses to a magnetic thin film having uniaxial anisotropy or an easy axis, switches or reverses the magnetic state of the film but that often repeated applications of one of the two pulses also causes, by a creeping action, a switching or destruction of the stored information in a film. This undesired creeping, which is a domain wall creeping, in magnetic storage films is brought about in magnetic film memory systems, by disturb magnetic fields, which, for example, may be partial or half select or stray fields.

One of the more serious problems at the present time with the development of thin magnetic film memory is the relatively high disturb sensitivity encountered in arrays having film elements driven by the simultaneous application thereto of mutually perpendicular magnetic fields, one of which is a strong word field. This high disturb sensitivity makes the use of very thick films and of a nondestructive mode of readout operation extremely impractical.

In the presently used memory film elements having an easy axis, a "0" bit of information is represented by magnetization of the film element in one direction of the easy axis and a "1" bit of information is represented by magnetization in the opposite easy direction. In an array employing word and bit lines, under the influence of small word fields, due to the neighboring word lines, bit fields and demagnetized fields, the film element splits up or divides into narrow domains parallel to the easy axis, which acts to demagnetize the film element. Since this demagnetization state of the film usually has no relationship to the original "0" or "1" bit of information, information stored in the film is generally lost. In an attempt to overcome the loss of information by the disturb fields, it has been suggested to choose the dimensions, thickness, the critical field and rotational threshold of the film such that the disturb sensitivity decreases to a tolerable limit.

It is an object of this invention to provide a magnetic storage system in which information is stored in a film in its demagnetized state.

Another object of this invention is to provide a magnetic storage system employing magnetic films providing relatively large output signals.

Yet another object of this invention is to provide a magnetic storage system employing magnetic films which may be read out nondestructively.

Still another object of this invention is to provide a magnetic storage system employing thick films which are less disturb sensitive than such prior systems.

A further object of this invention is to provide a magnetic film storage system which readily provides an output signal and its complement.

In accordance with the present invention a storage system is provided which includes means for applying in the hard direction a magnetic field to a magnetic film capable of demagnetizing itself and a control magnetic field for determining the direction of magnetic domains in the film in its demagnetized state.

An important advantage of this invention is that the film stores information in its lowest possible energy state and, therefore, the film is not sensitive to disturb fields.

An important feature of this invention is that a magnetic film storage system is provided capable of utilizing thick films, relatively insensitive to disturb fields, which requires little or no additional circuitry beyond that used in prior art magnetic film systems.

The foregoing and other objects, features and advantages of the invention will be apparent from the following more particular description of preferred embodiments of the invention, as illustrated in the accompanying drawings.

Figure 2:
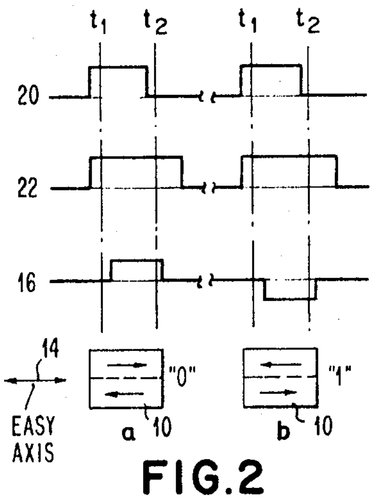
Figure 3:
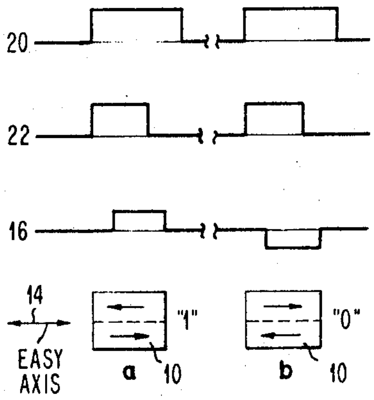
Figure 4:
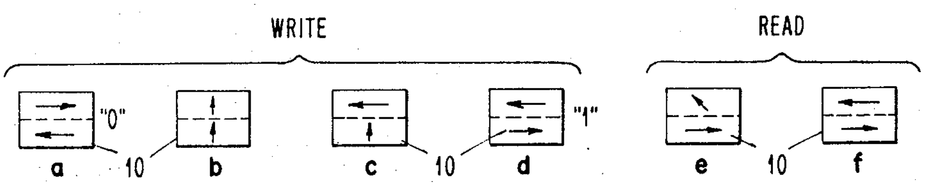
Figure 5:
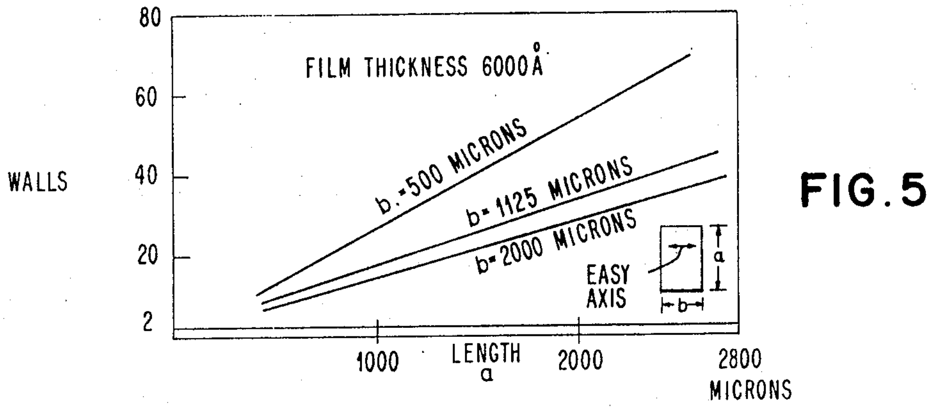
Figure 6:
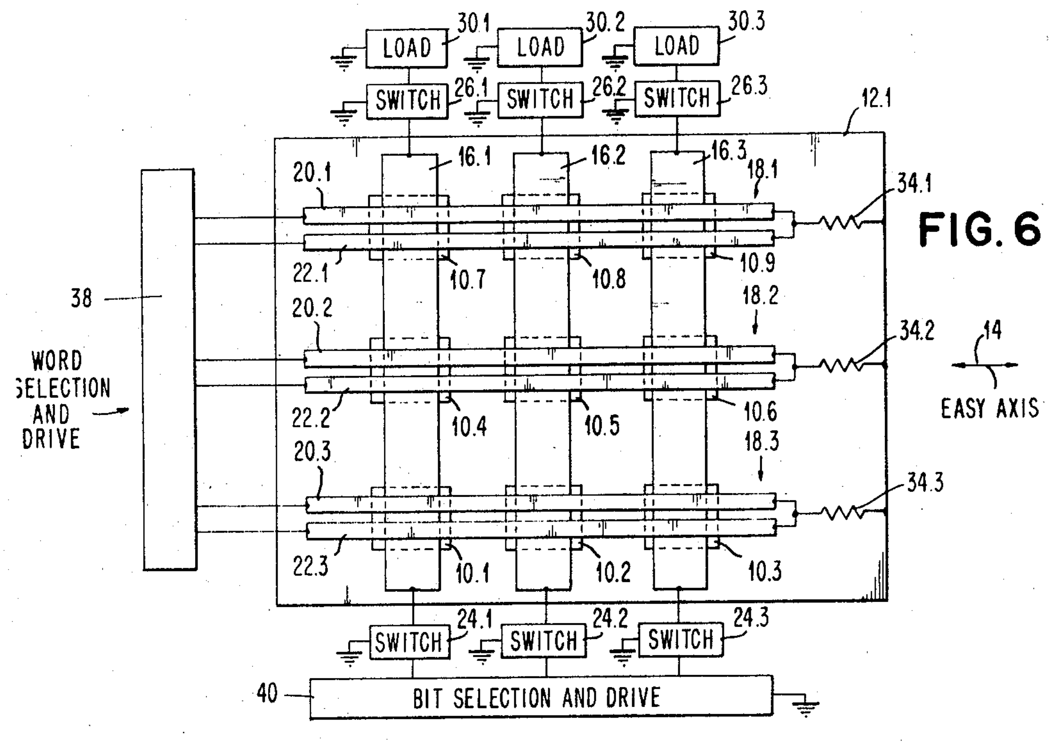
Figure 7:
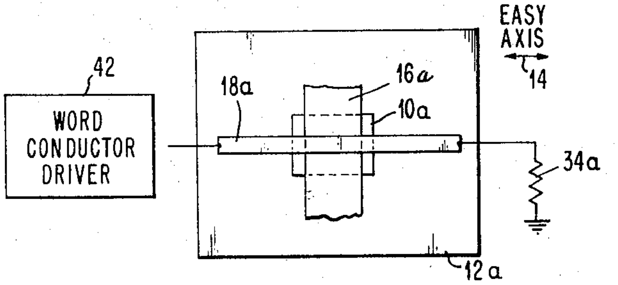
Figure 8:
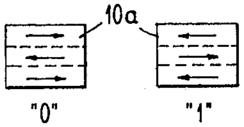

In the drawings:

FIG. 1 illustrates an embodiment of the magnetic storage system of the present invention showing only one storage element of the system of the present invention, FIG. 2 illustrates a first pulse program which may be used in the writing operation of the system of the present invention, FIG. 3 illustrates a second pulse program which may be used in the writing operation of the system of the present invention, FIG. 4 indicates the orientation of the flux in the film element of the system of the present invention at various times during the writing and reading operations of the system, FIG. 5 is a graph indicating the number of walls or domains into which the film splits up in the direction of its easy axis for various film widths as a function of varying film lengths, FIG. 6 shows a magnetic storage system of the present invention which includes a planar array having a plurality of film elements, FIG. 7 illustrates another embodiment of the magnetic storage system of the present invention which employs a single word line, and FIG. 8 illustrates the magnetic domain orientation for "0" and "1" magnetic states stored in the film elements of the embodiment illustrated in FIG. 7 of the drawing.

Referring to the drawings in more detail there is shown in FIG. 1, an embodiment of the magnetic storage system of the present invention which for purposes of illustration only is limited to a single magnetic film 10 deposited on a substrate 12, preferably an electrically conductive ground plane. The easy axis of the film 10 is indicated by the double-headed arrow 14 as being in the horizontal direction. A first or bit line 16 is disposed over the film 10 on the substrate or ground plane 12 in a direction orthogonal to the easy axis 14 over the film 10 and a second or word line 18 including a first conductor 20 and a second conductor 22 is also deposited over the film 10 on the substrate or ground plane 12 but in a direction parallel to that of the easy axis 14. The magnetic film 10, which may be made of permalloy or nickel iron alloy, as is well known, is illustrated as having a rectangular shape but it may have other shapes, such as elliptical, if desired. The bit and word lines 16 and 18 are preferably strip lines having overlapping portions disposed directly about the film 10. The first and second conductors 20 and 22 are arranged parallel to each other and are separated from each other by a distance equal to approximately ¼ of the width of one of the conductors 20, 22. A layer (not shown), for example, of silicon monoxide, is interposed between the two lines 16 and 18 and insulating layers may be provided on each side of the magnetic film 10. Bit line 16 is connected at one end to a first switching means 24 and at the other end to a second switching means 26. The first switching means 24 is operative to connect one end of the bit line 16 either to a bit line driver or generator 28 or to ground, while the second switching means 26 is operative to connect the other end of the bit line 16 either to ground or to a load 30, which may be a conventional sense amplifier. One end of the first conductor 20 of the word line 18 is connected to a first word conductor driver 32 and the other end of the first conductor 20 is connected to an impedance 34 and one end of the second conductor 22 of the word line 18 is connected to a second word conductor driver 36 and the other end of the second conductor 22 is connected to the impedance 34. The impedance 34 is preferably the characteristic impedance of the first and second conductors 20 and 22 of the word line 18. The first and second switching means 24 and 26 are preferably ganged so that when the one end of the bit line 16 is connected to the bit line driver 28 by the first switching means 24, the other end of the bit line 16 is connected to ground by the second switching means 26, and when the other end of the bit line 16 is connected by the second switching means 26 to the load 30, the one end of the bit line 16 is connected by the first switching means 24 to ground. By providing the first and second switching means 24 and 26 in the system of the present invention, the bit line 16 may be used as a common bit and sense line. If the switching means 24 and 26 are not used, an additional line similar to the bit line may be provided as a sense line. Of course, if desired, an end of the bit line 16 may also be selectively connected to its characteristic impedance instead of being directly connected to ground. When the substrate 12 is a ground plane, it is used as the return path for the bit and word lines.

FIG. 2 shows a pulse program for writing into film 10 of the system shown in FIG. 1 "0" and "1" bits of information. To write a "0" in the film 10, a first current pulse of a given duration, as indicated at line 20 of FIG. 2*a*, is passed through the first conductor 20 of the word line 18 of FIG. 1. Concurrently with the energization of the first conductor 20, a second current pulse of a duration longer than the given duration is passed through the second conductor 22 of word line 18, as indicated in FIG. 2*a* at line 22 and a third pulse of a given polarity, indicated at line 16 of FIG. 2*a*, is applied to the bit line 16. This third pulse is initiated prior to the termination of the first pulse on line 20 and terminated between the termination of the first pulse on line 20 and the termination of the second pulse on line 22 of FIG. 2*a*. To write a "1" in the film 10, the first, second and third current pulses are passed through the first and second conductors 20 and 22 and the bit line 16, respectively, in the manner described hereinabove in connection with the writing in of a "0" but the polarity of the third pulse is opposite to that of the given polarity, as indicated in FIG. 2*b* of the drawing.

By merely interchanging the duration of the pulses in the first and second conductors 20 and 22, the complement of the information which is stored by the pulse program indicated in FIG. 2 is stored in the film element 10 of the system of FIG. 1. As shown in FIGS. 3*a* and 3*b*, the pulse on line 20 is longer than the pulse on line 22. With the pulses of FIG. 3*a* having the relationships indicated on lines 20, 22 and 16, a "1" bit of information is stored in the film 10 of FIG. 1, and, with the pulses of FIG. 3*b* having the relationships indicated on lines 20, 22 and 16, a "0" bit of information is stored in the film 10 of FIG. 1. Although relatively square pulses are indicated in FIGS. 2 and 3, other shapes, for example, sawtooth, may be employed.

In FIG. 4 of the drawing there is indicated various domain orientations which occur in the film 10 during the write and read operations of the system of FIG. 1 of the drawing.

In the operation of the magnetic film storage system illustrated in FIG. 1 of the drawing, in order to write a "1" or a "0" in the film element 10, both conductors 20 and 22 of the word line 18 are activated by the first and second word conductor drivers 32 and 36, respectively, and also, the bit line 16 is activated, to produce the currents indicated in FIG. 2 of the drawing, the polarity of the current in the bit line 16 depending upon the information, that is, a "0" or a "1" to be written into the film 10. The word currents having magnitudes capable of producing a magnetic word field of 16 oersteds and bit currents having a magnitude capable of producing a magnetic bit field of 1 oersted have been found to satisfactorily write information into the film. Considering in more detail the pulse program indicated in FIG. 2 of the drawing, it can be seen that when current is passed concurrently through conductors 20 and 22 of the word line 18 such as during time $t_1$, the magnetization in the areas of the film 10 beneath each of the conductors 20 and 22 rotates from, for example, the horizontal magnetization states of a stored "0" bit, as indicated in FIG. 4*a* of the drawing into the hard direction of the film as indicated in FIG. 4*b*. When the current passing through the first conductor 20 is terminated, such as at time $t_2$, the magnetization in the area of the film 10 beneath the first conductor 20 is controlled by the bit field produced by the current passing through the bit line 16. To write a "1" into the film 10, the bit field rotates the magnetization in the film 10 beneath the first conductor 20 to the left along the easy axis and parallel to the applied bit field, as indicated in FIG. 4*c*. The bit field is turned off and then the word field produced by the current in the second conductor 22 is turned off. Due to the high magnetostatic coupling between the areas of the film beneath the first and second conductors 20 and 22, the magnetization in the area beneath the second conductor 22 rotates in the opposite direction or antiparallel to the magnetization beneath the first conductor 20 which causes the demagnetization of the film 10 and stores a "1" bit of information, as indicated in FIG. 4*d* of the drawing. It can be seen that in order to switch the film from the "1" bit storage state to the '0" bit storage state, it is only necessary to utilize the pulses indicated at FIG. 2*a* of the drawing.

When the sequence in which the currents passing through the first and second bit conductors 20 and 22 are switched off is reversed, the complementary information is written into the film element 10 even though the polarity of the bit current is not reversed. Such a pulse program is indicated in FIGS. 3*a* and 3*b* of the drawing. This complementary storage technique can be readily understood since the magnetic area of the film under the second conductor 22 now controls the direction of the domain in the film area under the first conductor 20 by magnetostatic coupling.

In order to read the information stored in the film 10 of the system of FIG. 1, only one of the two word conductors 20 and 22 is activated. The magnetic field due to current passing through the one conductor, for example, first conductor 20, rotates the magnetization beneath the first conductor 20, from, for example, the horizontal magnetization orientation of a stored "1," toward the hard direction, as indicated in FIG. 4*e* of the drawing. This rotation induces an output signal on the bit line 16 of FIG. 1 which is applied to the load 30, which may be a sense amplifier, by connecting the switch 26 to the load 30 and the switch 24 to ground. The output signal indicative of a "1" bit of information is of a given polarity and the output signal indicative of a "0" bit of information is of a polarity opposite to that of the given polarity. It can be seen than since the domain in film 10 under the second conductor 22 is substantially undisturbed, the magnetization of the film area under the first conductor will be restored due to magnetostatic coupling, even when a very high field driving the magnetization into the hard direction is applied to the film area under the first conductor 20.

The main cause for disturb sensitivity of a film is the fact that when a word is written in a given word line, stray fields are produced from the current passing through the given word line which are applied to the adjacent word lines. The adjacent word lines are each subjected simultaneous to word fields which can be as high as 10 to 20% of the full world fields of the given word line and to the full bit fields. By storing information in the film elements in their demagnetized state in accordance with the present invention, the film elements of the system are very resistant even to these strong disturb fields.

An added advantage of the system of this invention is that by employing one conductor of the two conductors 20 and 22 of the word line 18, a given bit of information can be read out and by merely using the other conductor of two conductors 20 and 22 for reading, the complementary bit of information is produced, which in many applications is very useful.

It should be understood that the magnetic film element 10 may be of any type provided it is capable of demagnetizing itself, that is, when a field is applied to it in its hard direction and subsequently decreased, the film splits up or divides into two or more domains. In thin films, that is, films having a thickness approximately less than 1000 A, the width of these domains appears not to depend on the size of the film but on long wavelength anisotropy direction variations along the hard direction. For much thicker films, however, the domain width depends to a considerable extent on the size of the film element. For practical considerations, a film element is preferred which splits up or divides into two domains only.

The number of domains as a function of the film element dimension in the hard direction, with the film element dimension in the easy direction as a parameter, is plotted in the graph shown in FIG. 5 of the drawing. The film used to provide the information for the graph shown in FIG. 5 was a nickel-iron film having a thickness of 6000 A., a coercivity $H_c$ of 0.4 oersted and a uniaxial anisotropy field strength of 2.8 oersteds. A magnetic field having a value in excess of the sum of the demagnetization field $H_d$ and the uniaxial anisotropy field strength $H_k$ of the film was applied to this 6000 A. film in the hard direction and the number of domains in the film was counted, observations being made with the use of the magneto-optical Kerr effect and by employing Bitter techniques. From FIG. 5 of the drawing it may be observed that the number of domains in a film decreases when the film element is made wider in the direction of the easy axis and shorter in the hard direction. The film used in the system of the present invention which operated satisfactorily had a width of 2500 microns in the easy direction and a length of 500 microns in the hard direction, the film thickness was 4000 A. with an $H_c$=0.36 oersted and an $H_k$=3.5 oersteds. Strip lines for the word conductors 20 and 22 each having a width of 200 microns have been found to be satisfactory. The width of the bit line 16 may be at least several times wider than the width of one of the word conductors.

In FIG. 6 of the drawing there is illustrated an embodiment of the system of the present invention which includes a planar array having a plurality of word and bit lines. The system is word organized having a plurality of vertical bit lines 16.1, 16.2 and 16.3 and a plurality of horizontal word lines 18.1, 18.2 and 18.3. Beneath each of the intersections of the bit and word lines there is disposed a plurality of magnetic films 10.1 to 10.9 deposited on a ground plane 12.1, arranged in the manner described hereinabove in connection with the system illustrated in FIG. 1 of the drawing. The word line 18.1 includes a first word conductor 20.1 and a second word conductor 22.2, each of the conductors being connected at one end to the ground plane 12.1 through a first word line terminating impedance 34.1, while the other end is connected to a word and select drive means 38 capable of providing address selection of a particular word line 18.1, 18.2 or 18.3 and the pulse generation corresponding to the first and second word conductor drivers 32 and 36 of the system of FIG. 1. Word line 18.2 includes a first word conductor 20.2 and a second word conductor 22.2 which are connected at one end to a second word line terminating impedance 34.2 and at the other end to the word selection and drive means 38. The word line 18.3 includes a first word conductor 20.3 and a second word conductor 22.3 which are connected at one end to a third word line terminating impedance 34.3 and at the other end to the word selection and drive means 38. The bit lines 16.1, 16.2 and 16.3 are connected to a bit selection and drive means 40 through a respective switch 24.1, 24.2 and 24.3 and are further connected at an opposite end to loads 30.1, 30.2 and 30.3 through a respective switch 26.1, 26.2 and 26.3. The means 40 provides the function of bit addressing and pulse generating corresponding to the bit line driver 28 of FIG. 1, while each switch 24.1, 24.2 and 24.3 corresponds to the switch 24 and each switch 26.1, 26.2 and 26.3 corresponds to the switch 26 of the system of FIG. 1. The easy axis of the magnetic films 10.1 to 10.9 is indicated by the horizontal double-headed arrow 14.

In the operation of the system illustrated in FIG. 6 of the drawing, when "1" and "0" bits of information are to be written into the film elements of a word line, for example, elements 10.4, 10.5 and 10.6 of the word line 18.2, the word select and drive means 38 is operated to pass a current corresponding to the current indicated on line 20 of FIG. 2 of the drawing through the first word conductor 20.2 and a current corresponding to the current indicated on line 22 of FIG. 2 of the drawing, through the second word conductor 22.2 each of the currents having a magnitude sufficient to saturate the films in the hard direction or to produce a field in the hard direction at least equal to the sum of the demagnetization field $H_d$ in the hard direction and the uniaxial anisotropy field strength $H_k$ of the film elements. The bit selection and drive means 40 is operated to pass through the bit lines 16.1, 16.2 and 16.3 currents related in time to the currents in the conductors 20 and 22 of FIG. 1, as indicated in FIG. 2 of the drawing, and having polarities corresponding to the bit or digital information to be stored in the film elements 10.4, 10.5 and 10.6, in the manner described hereinabove in connection with the writing of "1" and "0" bits of information in the system of FIG. 1. It should be noted that when the currents in conductors 20.2, 22.2 of line 18.2 and in bit lines 16.1, 16.2 and 16.3 have been terminated, the film elements 10.4, 10.5 and 10.6 will store the desired digital information in demagnetized states of each of the films, that is, the films will be in their lowest possible energy states. Accordingly, it can be seen that when large currents are passed through the first and second word conductors 20.2 and 22.2 of word line 18.2, stray magnetic fields from the word line 18.2 tend to produce disturb fields in the film elements 10.1, 10.2 and 10.3 and 10.7, 10.8 and 10.9 of the two adjacent word lines 18.1 and 18.3, respectively. Since the information is stored in the film elements with the film elements in their lowest energy state, the disturb fields cannot demagnetize or place the films in a lower energy state. When the information stored in the magnetic elements 10.4, 10.5 and 10.6 of the word line 18.2 is to be read out, the word selection and drive means 38 is operated to pass a current through the first word conductor 20.2 of the word line 18.2 having a magnitude which is preferably less than the sum $H_d$ and $H_k$ of any one of the film elements 10.4, 10.5 or 10.6, which field orients the magnetization of the domain of each of the films beneath the conductor 20.2 in a direction which may be approximately equal to the hard direction, for example, as indicated in the upper domain of the film illustrated in FIG. 4*e* of the drawing. When the read field produced by the current passing through the first conductor 20.2 is removed, the magnetization in the films is restored to the original storage position due to the magnetostatic coupling between the domains of the films and the preferred axis of magnetization of the films, thus, providing a nondestructive mode reading operation. Information is written into and read out of the films associated with the word lines 18.1 and 18.3 in the manner described hereinabove in connection with the handling of information in word line 18.2 by the operation of the word and bit selection and drive means 38 and 40. The output signals indicative of the stored information are dipolar as stated hereinabove in connection with the description of FIG. 1 of the drawing.

In FIG. 7 there is illustrated an embodiment of the system of the present invention which overcomes the necessity of providing an extra word conductor to the word line. As shown in FIG. 7 of the drawing, a film element **10*a* is deposited on a ground plane 12*a* and a bit line 16*a* is disposed over the film element 10*a* in a direction corresponding to the hard direction of the film 10*a*, in a manner similar to that described hereinabove in connection with the system illustrated in FIG. 1 of the drawing. The bit line 16*a* is connected to circuit elements similar to that illustrated in FIG. 1 of the drawing. A word line 18*a* which has but a single conductor is connected at one end to a word line terminating impedance 34*a* and at the other end to a word conductor driver 42. The domain orientation for the storage of "0" and "1" bits of information in the demagnetized state of the film element 10*a*** is indicated in FIG. 8 of the drawing.

In the operation of the system illustrated in FIG. 7 of the drawing, in order to write a "1" or a "0" into the film element **10*a*, a large current is sent through the word line 18*a* from the word driver 42. This current has a magnitude such that even the parts of the film 10*a* which are not directly beneath the word line 18*a* are saturated in the hard direction. When this word current is decreased to a value below the sum of $H_d$ and $H_k$ of the film 10*a* while a bit field produced by current passing through the bit line 16*a* is applied to the film element 10*a*, the magnetization at the edges of the film element 10*a*, that is, in the areas of the film element 10*a* not directly beneath the word line 18*a* begins to rotate in the bit field direction. At a still lower hard direction field with the bit field removed, the magnetization in the film area directly beneath the word line 18*a* starts to rotate but, due to magnetostatic coupling, in a direction opposite to the direction of magnetization in the two edge areas not directly beneath the word line 18*a*. Thus, three domains, representing "0" or "1" bits of information, are finally produced in the film, as indicated in FIG. 8 of the drawing, placing the film element 10*a* in its demagnetized state. Word line currents having a larger magnitude than that employed in the two-conductor word line embodiment of the system of the present invention were required to write information into the film element 10*a*. This larger current can be appreciably reduced by providing inhomogeneous fields in the element 10*a*, for example, by employing a slotted or bisected word line which may have portions overlaying the edge areas of the film element 10*a*. To read out the information stored in the film element 10*a*, a word line current in line 18*a* is provided which has a magnitude sufficient to rotate the magnetization of the center domain of the film 10*a* toward the hard direction without materially disturbing the magnetic orientation of the two edge areas. The output signal is provided in bit line 16** as in the system of FIG. 1.

It should be understood that the teachings of the present invention are applicable to systems having two or three dimensional magnetic memory arrays and conducting or nonconducting film substrates and that the invention is not limited to bit lines arranged orthogonally with respect to the word lines. Furthermore, the magnetic films may be made of nickel-iron alloys, such as an 80% nickel-20% iron alloy, or other suitable magnetic material which is capable of being demagnetized. Uniaxial anisotropy may be induced in the film in any known manner. It should also be understood that films which demagnetize into four or more domains may also be employed in the system of this invention by, for example, disposing in a serial fashion the first conductor of the word line over all of the domains oriented in a given direction and disposing in a similar serial fashion the second conductor for the word line over all the domains oriented in the direction opposite the given direction.

Since rotational switching processes occur in the films used in the system of the present invention, it can be seen that the memory system of the present invention operates at extremely high switching speeds. It should also be noted the thick films employed in the system of the present invention have an $H_d$ in the hard direction larger than $H_k$. Therefore, the driving field conditions at the films depend mostly on the $H_d$, which in turn depends on the geometry of the magnetic elements and the strip lines. The geometry of the film elements can easily be controlled so the tolerations for the evaporation conditions of the film elements is very moderate.

Although a single film capable of demagnetizing into two or more domains may be employed in the system of the present invention, it is also within the scope of this invention, to employ multiple films, each having a single domain, disposed adjacent to each other with an air gap equal to zero, if desired.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Magnetic data storage apparatus comprising:

a magnetic film storage element having an easy axis of magnetization and capable of assuming a substantially demagnetized state wherein different portions of said element are respectively magnetized in opposite directions along said easy axis;

first means for initially magnetizing several portions of said film storage element in a direction substantially orthogonal to said easy axis during a first interval of limited duration and for thereafter maintaining a selected one of said portions magnetized in said orthogonal direction for a second interval of limited duration;

second means effective upon termination of said first interval and prior to the termination of said second interval for causing the magnetization of at least one of said portions other than said one portion of said film storage element to become oriented in a selected one of two directions along said easy axis according to the binary quantity which is to be stored in said element, thereby causing the magnetization of said one portion to become oriented in the opposite direction along said easy axis upon termination of said second interval;

and third means for sensing the direction in which a given portion of said film storage element has been magnetized by said first and second means.

2. An apparatus as set forth in claim 1 wherein said first means includes first and second drive conductors extending substantially parallel with said easy axis, said second drive conductor being positioned in proximity to said one portion of said film storage element, and said first drive conductor being positioned in proximity to another portion of said element.

3. An apparatus as set forth in claim 1 wherein said first means includes a drive conductor extending substantially parallel with said easy axis and positioned closer to said one portion of said film storage element than it is to the remainder of said element.

References Cited

UNITED STATES PATENTS

| | | | |
|---|---|---|---|
| 3,298,005 | 1/1967 | Matick | 340—174 |
| 3,126,529 | 3/1964 | Hempel | 340—174 |
| 3,383,665 | 5/1968 | Kashiwagi | 340—174 |
| 3,154,768 | 10/1964 | Hardwick | 340—174 |

OTHER REFERENCES

"Thin-Film Memories," by E. E. Bittman, Instruments and Control Systems, March 1961, pp. 451–454.

"Patterns in Thin Films Make Nondestructive Memories," by Joseph W. Hart, Electronics, Feb. 17, 1961, pp. 126–129.

JAMES W. MOFFITT, Primary Examiner